US012783454B2

(12) United States Patent
Ng et al.

(10) Patent No.: US 12,783,454 B2
(45) Date of Patent: Nov. 3, 2026

(54) SYSTEMS AND METHODS FOR IMPLEMENTING DIRECTIONAL OPERAND BROADCAST AND MULTIPLY-ACCUMULATE EXECUTION USING A CONFIGURABLE PATCH MESH IN A MULTI-CORE PROCESSING ARRAY OF AN INTEGRATED CIRCUIT

(71) Applicant: quadric.io Inc., Burlingame, CA (US)

(72) Inventors: Thomas Ng, Burlingame, CA (US); Michael Leonard, Burlingame, CA (US); Aman Sikka, Burlingame, CA (US); Mark Morra, Burlingame, CA (US); Nigel Drego, Burlingame, CA (US)

(73) Assignee: quadric.io, Inc., Burlingame, CA (US)

( * ) Notice: Subject to any disclaimer, the term of this patent is extended or adjusted under 35 U.S.C. 154(b) by 0 days.

(21) Appl. No.: 19/551,719

(22) Filed: Feb. 27, 2026

(65) Prior Publication Data

US 2026/0187028 A1 Jul. 2, 2026

Related U.S. Application Data

(63) Continuation of application No. 19/273,567, filed on Jul. 18, 2025, now Pat. No. 12,596,673.
(Continued)

(51) Int. Cl.
*G06F 9/38* (2018.01)
*G06F 9/50* (2006.01)
(Continued)

(52) U.S. Cl.
CPC ........ *G06F 15/8046* (2013.01); *G06F 9/3888* (2023.08); *G06F 9/3891* (2013.01);
(Continued)

(58) Field of Classification Search
CPC .. G06F 15/8046; G06F 9/3888; G06F 9/3891; G06F 9/3893; G06F 9/542;
(Continued)

(56) References Cited

U.S. PATENT DOCUMENTS

| | | | |
|---|---|---|---|
| 5,659,785 | A | 8/1997 | Pechanek et al. |
| 10,356,860 | B2 | 7/2019 | Drego et al. |

(Continued)

OTHER PUBLICATIONS

Kung, SY. On supercomputing with systolic/wavefront array processors. Proceedings of the IEEE, vol. 72, No. 7, pp. 867-884, Jul. 1984 [online], [retrieved on Apr. 17, 2026]. Retrieved from the Internet <URL: https://ieeexplore.ieee.org/document/1457212> <DOI: 10.1109/PROC.1984.12944>.*
(Continued)

*Primary Examiner* — Shawn Doman
(74) *Attorney, Agent, or Firm* — Padowithz Alce; Jack Holman; Alce PLLC

(57) ABSTRACT

A technique is disclosed for operand propagation and accumulation within a processing array of an integrated circuit using overlapping patch regions. The system includes an interconnecting processing patch defined over a rectilinear subset of processing elements, with an origin processing element broadcasting operand data to the remaining elements in a directionally constrained, time-staggered wavefront pattern. A logical processing patch is separately defined over a second rectilinear subset of processing elements. The interconnecting processing patch and the logical processing patch partially overlap to form an interconnecting patch mesh comprising a common set of processing elements. Operand data is propagated from the origin of the interconnecting patch to the common processing elements within the patch mesh, enabling operand handoff or accumulation across patch boundaries. The architecture supports fine-grained, localized data movement and patch-level
(Continued)

execution coordination across a mesh of processing elements to optimize compute reuse, operand locality, and execution throughput.

19 Claims, 5 Drawing Sheets

Related U.S. Application Data

(60) Provisional application No. 63/673,459, filed on Jul. 19, 2024.

(51) Int. Cl.
*G06F 9/54* (2006.01)
*G06F 15/173* (2006.01)
*G06F 15/80* (2006.01)
*G06F 15/82* (2006.01)

(52) U.S. Cl.
CPC ............ *G06F 9/3893* (2013.01); *G06F 9/542* (2013.01); *G06F 15/80* (2013.01); *G06F 15/8023* (2013.01); *G06F 15/82* (2013.01); *G06F 15/825* (2013.01); *G06F 2209/543* (2013.01)

(58) Field of Classification Search
CPC ...... G06F 15/80; G06F 15/8023; G06F 15/82; G06F 15/825; G06F 2209/543
See application file for complete search history.

(56) References Cited

U.S. PATENT DOCUMENTS

| | | | | |
|---|---|---|---|---|
| 11,409,694 | B2 | 8/2022 | Kim et al. | |
| 11,422,773 | B1 * | 8/2022 | Volpe | G06F 7/523 |
| 11,500,802 | B1 * | 11/2022 | Xu | G06F 15/17318 |
| 11,625,453 | B1 * | 4/2023 | Meyer | G06F 15/8046 706/15 |
| 2004/0133765 | A1 | 7/2004 | Tanaka et al. | |
| 2006/0004942 | A1 | 1/2006 | Hetherington et al. | |
| 2012/0079340 | A1 * | 3/2012 | Gunnam | H04L 25/03171 714/752 |
| 2013/0024666 | A1 * | 1/2013 | Lee | G06F 9/3012 712/214 |
| 2017/0083313 | A1 * | 3/2017 | Sankaralingam | G06F 15/7867 |
| 2017/0364473 | A1 * | 12/2017 | Singh | G06F 15/177 |
| 2018/0189231 | A1 * | 7/2018 | Fleming, Jr. | G06F 12/0842 |
| 2018/0225403 | A1 * | 8/2018 | Nicol | G06F 30/34 |
| 2019/0057060 | A1 * | 2/2019 | Nicol | G06F 15/80 |
| 2019/0102179 | A1 * | 4/2019 | Fleming | G06F 9/3017 |
| 2020/0257467 | A1 | 8/2020 | Drego et al. | |
| 2020/0272467 | A1 | 8/2020 | Kesirju et al. | |
| 2021/0019591 | A1 * | 1/2021 | Venkatesh | G06N 3/063 |
| 2021/0150770 | A1 * | 5/2021 | Appu | G06T 15/005 |
| 2021/0201118 | A1 | 7/2021 | Chen et al. | |
| 2022/0100575 | A1 * | 3/2022 | Lee | G06F 9/5066 |
| 2022/0207358 | A1 * | 6/2022 | Nimmagadda | G06N 3/045 |
| 2022/0366010 | A1 * | 11/2022 | Simpson | G06F 7/16 |
| 2022/0374288 | A1 * | 11/2022 | Kibardin | G06N 3/084 |
| 2022/0413924 | A1 * | 12/2022 | Parra | G06F 9/5027 |
| 2023/0139347 | A1 * | 5/2023 | Bondarenko | G06F 40/30 704/9 |
| 2024/0020265 | A1 * | 1/2024 | Fu | G06F 15/825 |
| 2024/0078182 | A1 * | 3/2024 | Foley | G06F 8/445 |
| 2024/0220448 | A1 * | 7/2024 | Mei | G06F 15/8046 |
| 2024/0272959 | A1 | 8/2024 | Miller et al. | |
| 2024/0412045 | A1 | 12/2024 | Shapiro et al. | |
| 2025/0199997 | A1 | 6/2025 | Denduluri et al. | |
| 2025/0292354 | A1 * | 9/2025 | Fu | G06F 17/16 |
| 2025/0307345 | A1 * | 10/2025 | Greig | G06F 9/505 |
| 2025/0390723 | A1 * | 12/2025 | Fortkort | G06N 3/049 |

OTHER PUBLICATIONS

Firuzan, A et al. Reconfigurable Network-on-Chip based Convolutional Neural Network Accelerator. Journal of Systems Architecture vol. 129, Aug. 2022, [retrieved Apr. 17, 2026]. Retrieved from the Internet <URL: https://www.sciencedirect.com/science/article/pii/S1383762122001175> <DOI: 10.1016/j.sysarc.2022.102567>.*

Zhang, B et al. A Novel CONV Acceleration Strategy Based on Logical PE Set Segmentation for Row Stationary Dataflow, IEEE Transactions on Computers, vol. 71, No. 6, pp. 1466-1478, Jun. 1, 2022, [retrieved on Apr. 17, 2026]. Retrieved from the Internet <URL: https://ieeexplore.ieee.org/document/9456039> <DOI: 10.1109.*

* cited by examiner

SYSTEMS AND METHODS FOR IMPLEMENTING DIRECTIONAL OPERAND BROADCAST AND MULTIPLY-ACCUMULATE EXECUTION USING A CONFIGURABLE PATCH MESH IN A MULTI-CORE PROCESSING ARRAY OF AN INTEGRATED CIRCUIT

CROSS-REFERENCE TO RELATED APPLICATIONS

This application is a continuation of U.S. patent application Ser. No. 19/273,567, filed 18 Jul. 2025, which claims the benefit of U.S. Provisional Application No. 63/673,459, filed 19 Jul. 2024, which are incorporated herein in their entireties by this reference.

TECHNICAL FIELD

The present application relates generally to integrated circuitry, and more specifically to a configurable mesh interconnect architecture and data broadcast techniques for efficient multiply-accumulate operations within arrays of processing cores in the integrated circuitry field.

BACKGROUND

Modern compute-intensive applications such as machine learning inference, signal processing, and real-time data analytics increasingly rely on highly parallel architectures to execute matrix-oriented computations. Multiply-accumulate (MAC) operations are frequently used in convolutional, dot product, and attention-based workloads. In many architectures, these operations are performed across arrays of processing elements arranged in a two-dimensional topology. Operand data, such as weights, activations, or key-value pairs, must often be delivered to multiple compute units in a manner that aligns with the desired execution schedule and data reuse pattern.

Conventional architectures may utilize full-array broadcasting, shared memory staging, or hierarchical data routing to distribute operand values across the processing array. In some systems, operand distribution may be managed through centralized dispatch or coordinated access to global interconnects. While such techniques support general-purpose operand movement, they may require complex routing logic, global synchronization, or memory access patterns that reduce locality.

Some systems employ systolic or wavefront execution models, in which operand data may be propagated across processing elements according to a predefined sequence. These models may facilitate pipelined execution but may also constrain operand timing or spatial reuse when applied to irregular computation domains.

Accordingly, there remains a need in the integrated circuitry field for operand distribution techniques that permit localized, directionally controlled broadcasting of operands to selected subsets of processing elements. There also remains a need for compute scheduling frameworks that enable deterministic multiply-accumulate operations across such subsets while minimizing interconnect congestion and improving temporal alignment of data arrival and compute triggering.

The embodiments of the present application described herein provide technical solutions that address, at least the needs described above.

BRIEF SUMMARY OF THE EMBODIMENT(S)

Figure 1:
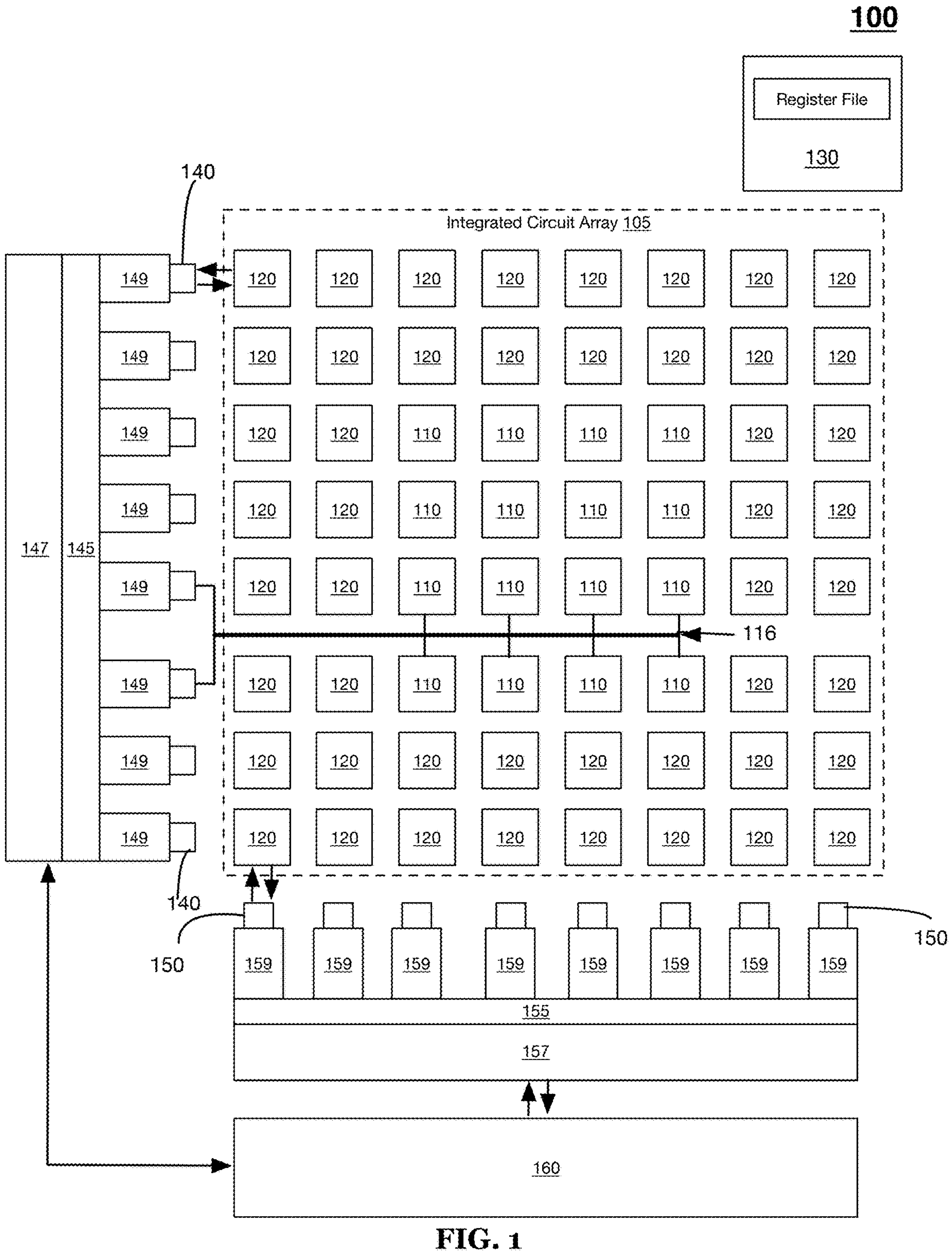
FIG. 1 Related Art
FIG. 1 illustrates a schematic of a system 100 in accordance with one or more embodiments of the present application.

In one embodiment, a method for operand propagation and accumulation across overlapping patch regions in a processing array includes implementing an interconnecting processing patch encompassing a subset of processing elements and broadcasting operand data from an origin processing element using a time-staggered, directionally constrained wavefront pattern. The method further includes implementing a logical processing patch with a second subset of processing elements, wherein a portion of the interconnecting processing patch overlaps a portion of the logical processing patch to form an interconnecting patch mesh, and propagating operand data from the origin processing element to the common processing elements of the patch mesh.

In one embodiment, the common processing elements of the interconnecting patch mesh perform data accumulation or handoff between the interconnecting and logical processing patches.

In one embodiment, the interconnecting processing patch is configured in a patch mode that defines an operand reuse pattern, such as depth-firing or face-firing, to control directional propagation and accumulation.

In one embodiment, the operand data is propagated in a wavefront pattern that results in staggered arrival times based on Manhattan distance from the origin processing element.

In one embodiment, the interconnecting and logical processing patches are defined using instruction identifiers comprising region and coordinate values.

In one embodiment, each processing element within the interconnecting patch mesh stores intermediate results in a ping-pong buffer composed of alternating storage registers for concurrent accumulation and result access.

In one embodiment, a feedback mechanism is implemented, where feedback data generated by one or more processing elements is directionally propagated back to the origin processing element along a feedback pathway distinct from the operand propagation route.

In one embodiment, a bridging processing element located at a center of the logical processing patch receives operand data from the interconnecting patch and redistributes it to neighboring processing elements of the logical patch.

In one embodiment, the patch mesh is configured to allow the common set of processing elements to redistribute operand data to peripheral logical patch elements based on a propagation schedule.

In one embodiment, propagation of operand data from each processing element of the interconnecting patch is constrained to one or more permitted directions defined by a directional wall configuration.

In one embodiment, a second patch operation is executed in the logical processing patch using operand data from the interconnecting processing patch, thereby enabling patch-chained execution.

In one embodiment, the interconnecting patch mesh supports formation of irregular or sparse patch shapes by configuring at least one processing element in a data-passing mode that disables computation while preserving operand flow.

In one embodiment, a zero-point adjustment value is applied to operand data within the interconnecting patch mesh prior to or following accumulation, enabling support for asymmetric quantization.

In one embodiment, operand data is staged in a local FIFO buffer within one or more patch elements to align operand arrival with multiply-accumulate execution timing.

In one embodiment, each processing element propagates operand data directionally within the patch according to a wall configuration parameter restricting propagation across defined boundaries.

In one embodiment, operand propagation or accumulation schedules may include programmable pauses controlled by a pause count value stored in a control register.

In one embodiment, operand data may be routed into a patch-shared FIFO buffer within a processing element that is temporarily unable to execute a multiply-accumulate operation.

In one embodiment, a data-passing mode may be used to permit operand flow through processing elements that are disabled for computation, enabling flexible routing within irregular patch meshes.

In one embodiment, a method for operand propagation and accumulation includes broadcasting operand data from an origin processing element of a first patch to a shared subset of processing elements in an overlapping region with a second patch.

In one embodiment, a method for patch-based propagation includes broadcasting operand data from a first patch to a patch mesh shared with a second patch to support operand reuse and inter-patch dataflow.

In one embodiment, a method for operand propagation and accumulation across overlapping patch regions in a processing array includes implementing an interconnecting processing patch comprising a region of processing elements; broadcasting operand data from an origin processing element of the interconnecting patch in a systolic manner; implementing a logical processing patch comprising a second region of processing elements; and forming an interconnecting patch mesh through partial overlap of the two patches, wherein operand data is propagated from the origin processing element to a common subset of processing elements within the interconnecting patch mesh.

In one embodiment, a method includes implementing a first patch comprising a region of processing elements and broadcasting operand data from an origin processing element of the first patch in a systolic manner; implementing a second patch comprising a second region of processing elements; defining a patch mesh by overlapping the first and second patches; and propagating operand data from the origin of the first patch to a shared subset of processing elements within the patch mesh.

In one embodiment, a system for operand propagation and accumulation includes a plurality of processing elements arranged in a processing array; interconnect logic defining a first patch and a second patch, each encompassing a rectilinear region of the processing array; and a control unit configured to broadcast operand data from an origin processing element in the first patch, form an interconnecting patch mesh through partial overlap of the first and second patches, and propagate operand data to a shared subset of processing elements within the patch mesh.

DESCRIPTION OF THE PREFERRED EMBODIMENTS

The following description of preferred embodiments of the present application are not intended to limit the inventions to these preferred embodiments, but rather to enable any person skilled in the art to make and use these inventions.

Overview

In one or more embodiments of the present application, the systems and techniques described herein may provide a mechanism for executing multiply-accumulate operations across a programmable array of processing elements using a spatially defined and directionally propagated operand distribution technique referred to as a patch mesh interconnect. In such embodiments, operand broadcast and execution scheduling may be coordinated within a localized region of the array, termed a patch, wherein operand propagation occurs from an origin core to all other processing elements included in the patch via a unidirectional and latency-aware mesh structure.

In the one or more embodiments, the systems and methods may function to define a patch region having one or more patch configuration parameters, including patch size, patch depth, and patch mode. Based on such configuration, the patch mesh interconnect may establish point-to-point or staged operand transfer pathways from the origin core to the destination cores. Operand arrival at each destination core may be deterministically aligned with execution of a multiply-accumulate operation, leveraging timing-aware operand latching and localized storage of secondary operands. Execution results may be accumulated and written to local memory in a pipelined manner that minimizes register pressure and avoids global memory dependence.

The systems and methods described herein may improve MAC unit utilization by reducing data movement overhead and minimizing compute stalls resulting from memory transfer latency. By keeping operand delivery and execution confined to a configurable patch, the systems may achieve higher throughput with reduced interconnect congestion. In some embodiments, performance enhancements may be realized through patch reuse across multiple computation passes, resulting in minimized reconfiguration overhead and sustained dataflow efficiency across compute layers such as matrix multiplication, attention mechanisms, or convolutional stencils.

At least a few technical benefits of the above-noted embodiments of the present application include improved compute locality, minimized operand fetch latency, and higher utilization of arithmetic units across varied operand reuse scenarios. The patch mesh architecture may be implemented in any suitable processing environment, including but not limited to neural network accelerators, AI inference chips, and reconfigurable integrated circuits.

The mesh architecture defined by the plurality of processing elements in the array core preferably enable in-memory computing and data movement, as described in U.S. Pat. No. 10,365,860.

1. A System Architecture of a Dense Algorithm and/or Perception Processing Circuit (Unit)

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159, as described in U.S. Pat. Nos. 10,365,860, 10,691,464, and U.S. patent application Ser. No. 16/292,537, which are all incorporated herein in their entireties by this reference.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file of an array core 110 may be any suitable memory element or device but preferably comprises one or more static random-access memories (SRAMs). The register file may include a large number of registers, such as 1024 registers, that enables the storage of a sufficiently large data set for processing by the array core 110. Accordingly, a technical benefit achieved by an arrangement of the large register file within each array core 110 may be that the large register file reduces a need by an array core 110 to fetch and load data into its register file for processing. As a result, a number of clock cycles required by the array core to push data into and pull data out of memory may be significantly reduced or eliminated altogether. That is, the large register file increases the efficiencies of computations performed by an array core 110 because most, if not all, of the data that the array core 110 may be scheduled to process may be located immediately next to the processing circuitry (e.g., one or more MACs, ALU, etc.) of the array core 110. For instance, when implementing image processing by the integrated circuit 100 or related system using a neural network algorithm(s) or application(s) (e.g., convolutional neural network algorithms or the like), the large register file of an array core may function to enable a storage of all the image data required for processing an entire image. Accordingly, most or if not, all layer data of a neural network implementation (or similar compute-intensive application) may be stored locally in the large register file of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file and further, limiting the fetching and loading of data from an off-array core data source (e.g., main memory, periphery memory, etc.).

By comparison, to traverse a register file in a traditional system implemented by a GPU or the like, it may be typically required that memory addresses be issued for fetching data from memory. However, in a preferred embodiment that implements the large register file, the (raw) input data within the register file may be automatically incremented from the register file and data from neighboring core(s) (e.g., array cores and/or border cores) are continuously sourced to the register file to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border 120 may make a specific request for data from any of the memory elements within the memory hierarchy of the integrated circuit 100.

An array core 110 may, additionally or alternatively, include a plurality of multiplier (multiply) accumulators (MACs) or any suitable logic devices or digital circuits that may be capable of performing multiply and summation functions. In a preferred embodiment, each array core 110 includes four (4) MACs and each MAC may be arranged at or near a specific side of a rectangular shaped array core 110. While, in a preferred embodiment each of the plurality of MACs of an array core 110 may be arranged near or at the respective sides of the array core 110, it shall be known that the plurality of MACs may be arranged within (or possibly augmented to a periphery of an array core) the array core 110 in any suitable arrangement, pattern, position, and the like including at the respective corners of an array core 110. In a preferred embodiment, the arrangement of the plurality of MACs along the sides of an array core 110 enables efficient inflow or capture of input data received from one or more of the direct neighboring cores (i.e., an adjacent neighboring core) and the computation thereof by the array core 110 of the integrated circuit 100.

Accordingly, each of the plurality of MACs positioned within an array core 110 may function to have direct communication capabilities with neighboring cores (e.g., array cores, border cores, etc.) within the integrated circuit 100. The plurality of MACs may additionally function to execute computations using data (e.g., operands) sourced from the large register file of an array core 110. However, the plurality of MACs preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores 110. Accordingly, in some embodiments, multiple array cores 110 may be fed weights and/or coefficients data input via the weights bus 116 in parallel to thereby improve the speed of computation of the array cores 110.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that may be positioned next to one of the four sides or each of the faces of the array core 110. The ability of an array core 110 to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file. The register file may be configured similar to the register file of an array core 110 in that the register file may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores 110.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) may be received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it may be detected that no input sensor data or the like may be received with a predetermined input data flow to the integrated circuit array 105. Additionally, or alternatively, in one variation, the one or more border cores 120 may be automatically set to reflect values of one or more other border cores having input sensor data when it may be detected that no input sensor data or the like may be received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core 110 in performing computations on an input dataset.

In a preferred implementation of the integrated circuit 100, the progression of data into the plurality of array cores 110 and the plurality of border cores 120 for processing may preferably be based on a predetermined data flow schedule generated at the dispatcher 130. The predetermined data flow schedule enables input data from one or more sources (e.g., sensors, other NN layers, an upstream device, etc.) to be loaded into the border cores 120 and array cores 110 without requiring an explicit request for the input data from the border cores 120 and/or array cores 110. That is, the predetermined data flow schedule enables an automatic flow of raw data from memory elements (e.g., main memory 160) of the integrated circuit 100 to the plurality of border cores 120 and the plurality of array cores 110 having capacity to accept data for processing. For instance, in the case that an array core 110 functions to process a first subset of data of a data load stored in its register file, once the results of the processing of the first subset of data may be completed and sent out from the array core 110, the predetermined data flow schedule may function to enable an automatic flow of raw data into the array core 110 that adds to the data load at the register file and replaces the first subset of data that was previously processed by the array core 110. Accordingly, in such instance, no explicit request for additional raw data for processing may be required from the array core 110. Rather, the integrated circuit 100 implementing the dispatcher 130 may function to recognize that once the array core 110 has processed some amount of data sourced from its register file (or elsewhere) that the array core 110 may have additional capacity to accept additional data for processing.

Figure 3A:
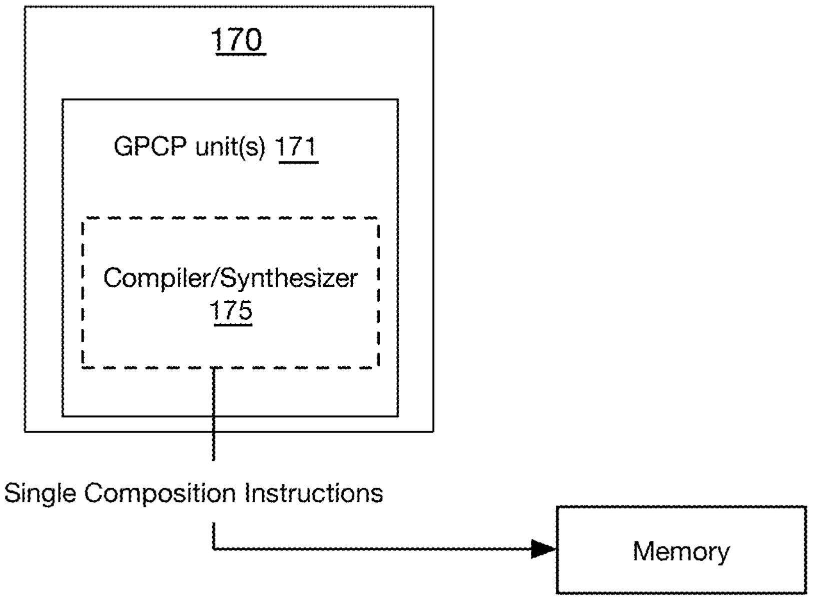
FIG. 3A Prior Art
FIGS. 3A-3B illustrate example mixed block and flow diagrams for instructions generation in accordance with one or more embodiments of the present application.
Figure 3B:
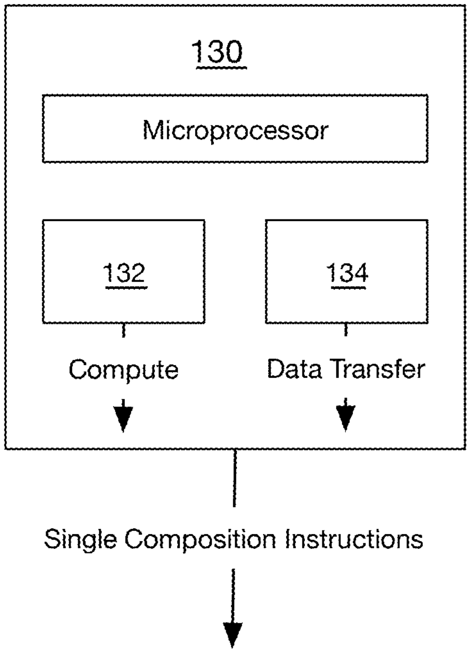
FIG. 3B Related Art

In a preferred embodiment, the integrated circuit 100 may be in operable communication with an instructions generator 170 that functions to generate computation, execution, and data movement instructions, as shown by way of example in FIGS. 3A-3B. The instructions generator 170 may be arranged off-chip relative to the components and circuitry of the integrated 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general-purpose computer processing (GPCP) units 171 that function to operate a compiler module 175 that may be specifically configured to generate multiple and/or disparate types of instructions. The compiler module 175 may be implemented using any suitable compiler software (e.g., a GNU Compiler Collection (GCC), a Clang compiler, and/or any suitable open-source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

In some embodiments, the processing circuitry of the dispatcher 130 includes disparate circuitry including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores 110. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 may be positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 may be positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it may be illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that may be specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that may be arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that may be arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA transfers may be triggered by a status or operation of one or more of the plurality of array cores 110. For instance, if an array core may be completing or has completed a processing of first set of data, the completion or near-completion may trigger the DMA transfers to enable additional data to enter the integrated circuit array 105 for processing.

Figure 4:
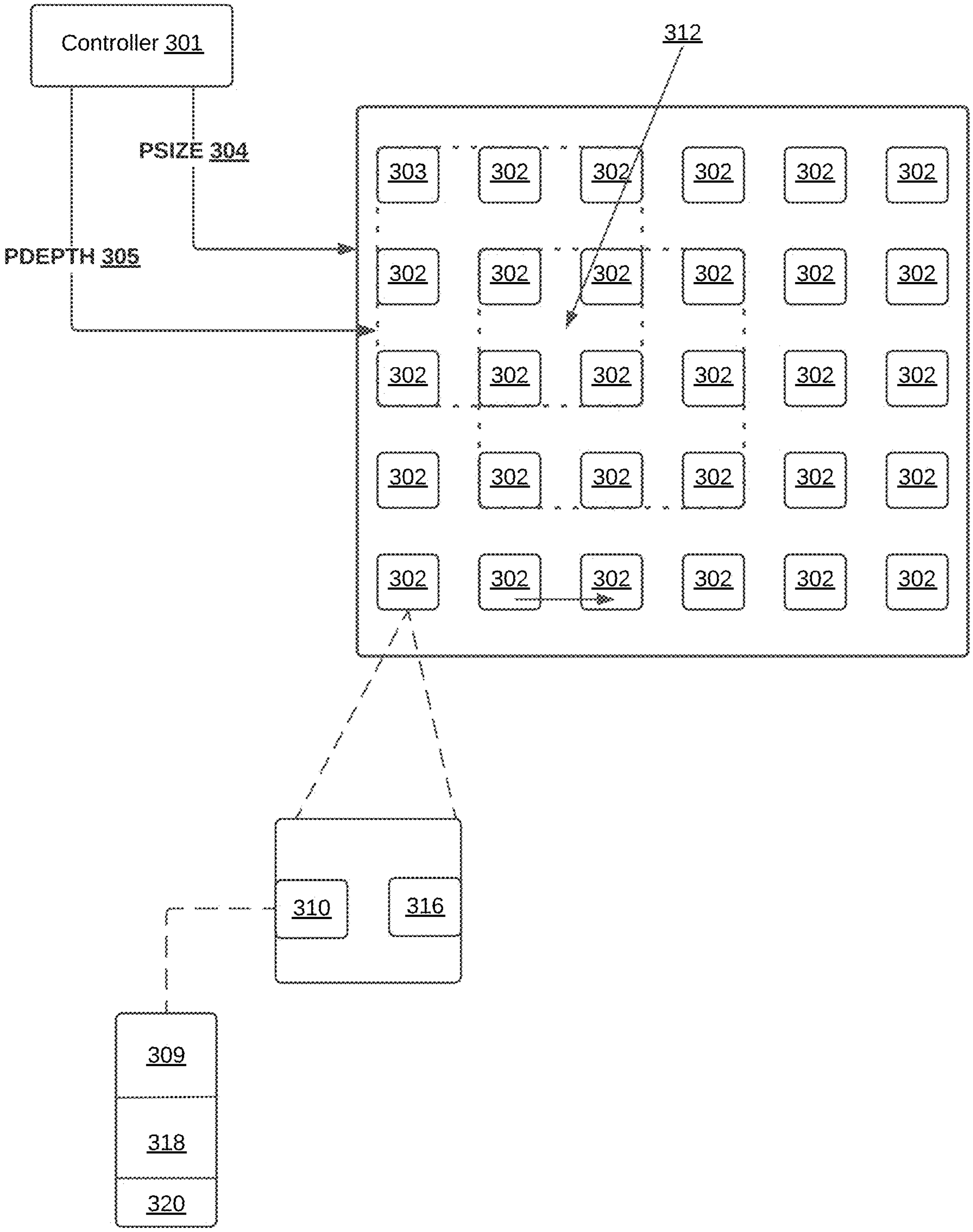
FIG. 4 illustrates a schematic representation of a patch mesh in accordance with one or more embodiments of the present application.

FIG. 4 illustrate an exemplary embodiment of an integrated circuit configured to execute broadcast and multiply-accumulate operations using a configurable patch mesh interconnect. As used herein, a patch mesh interconnect preferably refers to a dynamically configurable communication fabric that facilitates unidirectional or directional data propagation between a subset of processing elements arranged within a two-dimensional processing array. The subset of processing elements preferably defines a patch region within the two-dimensional processing array, and the patch mesh interconnect establishes data routing pathways exclusively among the processing elements included in that patch region. As used herein, a patch region refers to a selected subset of processing elements within a two-dimensional processing array. The patch region defines a spatial scope for coordinated operations, such as operand broadcasting and multiply-accumulate execution. The processing elements included in the patch region may be identified by a configuration controller, instruction parameters, or runtime control logic. In some embodiments, the patch region forms a contiguous rectangular block of processing elements. In other embodiments, the patch region may be non-rectangular, discontiguous, or adaptively defined based on data locality or workload structure. A patch region may include metadata such as patch size, patch depth, and patch mode, which govern its geometric extent and operational behavior.

The patch mesh interconnect may support operand broadcast operations originating from a designated origin core or origin processing element within the patch region. As used herein, an origin core refers to a processing element within a patch region designated to initiate a broadcast operation. The origin core receives or stages an operand value and triggers its directional propagation across the patch region using a patch mesh interconnect. The origin core may be identified based on its coordinate position, data residency, or explicit instruction encoding. The origin core may serve as a timing reference for operand arrival and MAC execution in other processing elements within the patch region. In some embodiments, the origin core participates in compute operations along with its broadcast responsibilities; in other embodiments, the origin core functions as a dedicated distribution node. Operand data may be propagated through the interconnect in a wavefront pattern, where each processing element receives the data with a latency that may be a deterministic function of its topological distance from the origin core of the patch mesh interconnect. As used herein, a wavefront pattern refers to the directional and time-ordered propagation of data or control signals across a set of processing elements. In the context of a patch mesh interconnect, a wavefront pattern defines the sequential arrival of a broadcast operand at each processing element within a patch region. The pattern may follow a Manhattan-distance gradient from an origin core, such that each element receives the operand in a clock cycle that may be offset by the number of interconnect hops from the origin. The wavefront pattern may be unidirectional, bidirectional, or diagonal depending on the interconnect configuration and operand firing mode. The deterministic nature of the wavefront pattern enables synchronized and non-overlapping compute operations across the patch region. It shall be recognized that processing elements of the interconnecting patch that are not part of the overlapping region may complete accumulation or propagation as configured but do not participate in operand forwarding into the logical patch. These elements may either stall, enter low-power state, or await patch reuse. The patch mesh interconnect may be implemented using point-to-point links, routing switches, or logical wiring overlays that are activated or reserved based on the current patch configuration.

In some embodiments, the patch mesh interconnect supports directionally constrained or predetermined operand data delivery, such that operand data propagation occurs preferably or only along specified axes or along a defined execution front. In such embodiments, the patch mesh interconnect may be statically or dynamically reconfigurable and may be designed to avoid interference with data movement occurring outside the patch region.

Accordingly, the patch mesh interconnect preferably provides a mechanism for spatially localized data distribution, synchronized operand delivery, and compute triggering aligned with systolic or pseudo-systolic execution models. The routing fabric may be integrated with or operate in parallel to global interconnect structures present in the processing array.

In one or more embodiments, the integrated circuit comprises a two-dimensional array of array processing cores 302 arranged in a rectilinear grid. Each array processing core 302 includes local register memory 310, a multiply-accumulate (MAC) unit 316, and control logic configured to participate in patch-based compute and data propagation operations.

In the illustrated embodiment, a subset of the array processing cores 302 may be selected to form a patch region, defined via configuration parameters such as a patch size (PSIZE) 304 and a patch depth (PDEPTH) 305. A patch configuration controller 301 determines the geometric extent of the patch and identifies a designated origin core 303 within the patch region. The patch may comprise a rectangular or irregularly shaped group of cores and may be dynamically reconfigured during runtime execution.

In some embodiments, a patch configuration controller may be operable to configure a patch region using a set of dedicated programmable registers. These registers may be written by an instruction dispatcher, a compiler-generated configuration stream, or a runtime scheduler. Each field within the register file may define a corresponding operational parameter for a patch mesh broadcast and multiply-accumulate execution.

The register configuration may include multiple fields. A patch size field, referred to as PSIZE, may specify the total number of processing elements in the patch. A patch depth field, referred to as PDEPTH, may specify the amount of data to be processed. A patch column count field, referred to as PCOLS, may define the maximum number of processing element columns in the physical patch and may be used to compute linear addresses for patch row traversal. A patch broadcast address field, referred to as PBA, may identify the logical address within local register memory from which the broadcast operand may be retrieved for forwarding to the origin core. A patch source address field, referred to as PSA, may identify the local address of the source operand used in the multiply-accumulate operation. A patch destination address field, referred to as PDA, may specify the target address in local register memory for writing the accumulation result. A patch core ID field, referred to as PCID, may be used to identify the coordinate of the current processing element in the patch mesh. A patch region ID field, referred to as PRID, may be used to label multiple patch regions operating within the same processing array or execution cycle. A patch wall field, referred to as PWALLS, may define the directional boundaries of the patch region and may indicate whether a processing element resides along a north, south, east, or west edge. The PWALLS value may also control the routing behavior of operand propagation.

The patch mode field, referred to as PMODE, may specify the operand reuse and compute sequencing behavior. A patch cycle count field, referred to as PCYCLES, may determine the number of compute cycles allocated for each patch. The PCYCLES value may be computed as a function of patch size, patch depth, and operand reuse strategy. A pause count field, referred to as PPAUSES, may indicate a number of execution pauses to insert between patch multiply-accumulate cycles. This may be used to interleave requantization steps, register refresh, or other auxiliary operations.

In some embodiments, instructions used to configure patch regions are broadcast uniformly across the processing array. Each processing element receives the same instruction stream and uses its local positional data, such as a global (x, y) coordinate along the processing array, to compute and populate internal patch control registers. This allows each processing element to autonomously determine its role, location, or boundary condition within a given patch region, despite executing the same instruction. The region identifier may designate a particular patch configuration, while local state allows for differentiated behavior across the array.

In one embodiment, each processing element is configured using a combination of a broadcast instruction and its local positional coordinates. The broadcast instruction includes a patch region identifier that is shared across all processing elements. Each processing element uses its own internal coordinate data (e.g., global x and y position) as an operand to compute and populate its control registers. This enables differentiated configuration, such as assigning patch-relative roles, boundary flags, or directional walls, despite identical instruction execution across the array.

In certain embodiments, additional control registers may be provided for advanced dataflow strategies, including asymmetric quantization, hierarchical accumulation, and patch chaining. For instance, a patch zero-point adjustment field, referred to as PZPA, may be defined for applying zero-point compensation in asymmetric quantized multiply-accumulate operations.

Each processing element may include a local instance of these configuration registers or may receive a broadcast configuration packet at the start of a patch execution cycle. During execution, the control logic within the processing element may reference the values in these fields to determine operand routing, compute scheduling, and memory access ordering. The use of a register-based control interface may allow for dynamic patch definition and reconfiguration with minimal control latency and may enable compiler-generated workloads to programmatically shape operand distribution and execution flow across the processing array.

In some embodiments, the patch mesh architecture may be configured to support asymmetric quantization during multiply-accumulate operations. Asymmetric quantization may be frequently employed in deep learning workloads to represent signed or unsigned integer values with an associated zero-point offset. In a typical configuration, a quantized input tensor or weight matrix may include a zero-point value that must be compensated for during execution in order to restore the arithmetic correctness of the accumulation result. Accordingly, in some embodiments, distinct zero-point adjustments may be applied to operands and weights independently, based on their quantization domains. Operand zero-points may be broadcast during patch initialization, while weight zero-points may be locally preloaded into PEs.

In one embodiment, the zero-point correction value is stored in a programmable register accessible to the processing elements of the patch mesh. The zero-point correction value may be applied to operand data either before accumulation (pre-shifted operand input) or after accumulation (bias correction). Each processing element retrieves the zero-point value from the register file to ensure quantization alignment across patch computations.

To enable such support, the register configuration may include a dedicated zero-point parameter referred to as PZPA. The value of PZPA may represent a zero-point offset associated with the broadcast operand and may be used to perform a bias correction during or after the multiply-accumulate sequence. In some implementations, a corresponding PZPB parameter may also be provided for source operands, allowing independent zero-point handling for both operand A and operand B.

In one embodiment, the zero-point compensation may be implemented by broadcasting a scalar correction term to each processing element at the beginning or end of a patch cycle. Each processing element may include local logic to apply a scalar multiplication and subtraction operation using the stored PZPA value and the known patch dimensions. This correction may occur before result writeback or may be integrated into a late-stage accumulation register. The timing and order of correction may be governed by additional configuration parameters, including PPAUSES or alternate modes of the patch scheduler.

The patch configuration controller may also be operable to coordinate a rebroadcast or scalar feed of the zero-point adjustment value at a defined cycle interval, using the same patch mesh interconnect infrastructure as the primary operand. In such implementations, the zero-point operand may be delivered through the same origin core routing path, but with a distinct scheduling tag or compute marker. This allows quantization correction to remain aligned with the systolic or wavefront propagation pattern of the main operand and ensures consistent alignment between broadcast latency and result accumulation.

In further embodiments, the quantization-aware patch execution may be interleaved with other compute phases using the pause insertion mechanism. During a defined pause cycle, the processing elements may temporarily disable MAC execution and perform scalar subtraction or addition to apply a correction based on PZPA and patch size. Upon completion of the quantization correction step, patch execution may resume using the stored configuration and operand pointers without requiring reinitialization.

Support for asymmetric quantization enables efficient and low-precision inference acceleration across a wide range of model types, including transformer layers, convolutional layers, and embedding operations. The described mechanism allows zero-point offset management to be integrated into the native operand broadcast and accumulation workflow of the patch mesh, without requiring external preprocessing or global reconfiguration.

Each array processing core includes a local register memory 310 that may be logically divided into a broadcast region 309, a source region 318, and a destination region 320. The broadcast region 309 may be configured to hold operand values intended to be fed into a patch operation. In one or more embodiments, the source region 318 preferably stores local data operands to be used in multiply-accumulate computations, while the destination region 320 receives accumulation results.

A feed path interconnect enables operand values from one or more array processing cores to be routed to the origin core 303. Once the operand value may be received by the origin core 303, the operand value may be staged in a broadcast staging register or similar holding buffer. The origin core 303 then initiates a unidirectional wavefront broadcast of the operand value using a patch mesh interconnect fabric 312.

In one or more embodiments, the patch mesh interconnect 312 may be configured to propagate operand values from the origin core 303 to other processing cores within the patch region using a wavefront propagation scheme. In one embodiment, the wavefront progresses outward from the origin core 303 in a Manhattan-distance order, such that each processing core within the patch region receives the broadcast value with a fixed delay relative to the number of inter-core hops from the origin core. The broadcast timing model enables deterministic compute scheduling across the patch.

Upon receiving the broadcast operand value, each array processing core stores the operand value in a broadcast operand latch or the like. When both the broadcast operand and the local source operand are available, the MAC unit 316 may be triggered to perform a multiply-accumulate operation. The output of the MAC unit 316 may be directed to a result staging buffer or optionally to a FIFO pipeline that queues the output for asynchronous writeback. In such embodiments, a writeback controller manages the transfer of accumulated results to the destination region 320 of the local register memory 310.

Accordingly, the patch architecture may function to enable a pipelined execution model in which feed, broadcast, MAC execution, and writeback may proceed concurrently across different processing cores. The wavefront broadcast and localized compute enable high utilization of MAC units while minimizing interconnect contention and reducing data movement cost relative to global broadcast schemes. The patch may be reused across multiple operations or dynamically reconfigured to accommodate varying workloads, including general matrix multiplies, convolutional operations, or transformer-style attention mechanisms.

In some embodiments, a patch may be reactivated with a new execution context or set of operands without requiring reconfiguration of the patch geometry or mode. This enables temporal reuse of patch definitions across multiple accumulation stages or layer passes.

In some embodiments, the patch mesh execution controller may support a programmable pause-resume mechanism that enables temporary suspension of patch-based multiply-accumulate operations. The pause mechanism may be initiated using a configuration parameter referred to as PPAUSES, which specifies the number of execution cycles or events during which patch activity may be temporarily halted before resuming the next compute phase.

The pause behavior may be activated during the execution of a patch cycle to facilitate interleaved processing such as quantization correction, intermediate data movement, or external synchronization. During a pause interval, a processing element may suspend operand access from the local register memory, halt MAC firing sequences, and disable operand propagation through the patch mesh interconnect. The propagation logic may preserve state and operand context to allow seamless continuation following the pause interval.

In some configurations, the pause interval may be used to permit partial accumulation, in which multiply-accumulate operations are temporarily suspended while intermediate results are retained within a local accumulation buffer or staging register. A downstream operation, such as a scalar adjustment, clamping, or scaling routine, may be applied to the stored value. Following completion of the intermediate step, the processing element may resume accumulation into the same buffer, maintaining continuity across successive operand broadcasts or patch iterations.

The resume phase may be triggered by a signal from the patch configuration controller or by a local restart token, such as a start (e.g., meustart) command issued by a scheduling FSM or instruction decoder. Upon receiving the resume signal, each processing element may reload operand pointers, refresh pipeline state, and continue broadcast or MAC execution in alignment with the previously defined patch parameters. Operand feed and result writeback logic may be re-enabled in accordance with pipeline availability and FIFO readiness.

The PPAUSES field may define a fixed number of stall cycles to insert between compute iterations or may be interpreted as a programmable delay slot between patch segments. In some implementations, the stall duration may be variable and based on downstream resource readiness or external system conditions. During the pause interval, power gating or operand clocking may be modulated to reduce energy consumption and avoid operand corruption.

Support for programmable pause-resume and partial accumulation behavior allows the patch mesh architecture to accommodate auxiliary arithmetic operations, non-linear transformations, or fine-grained quantization adjustments within the patch execution flow. This flexibility enables compliance with a wide range of machine learning models that require interleaved compute and correction steps across tiled or quantized layers.

Feedback Mechanism within Interconnecting Patch Mesh

In some embodiments, processing elements within the interconnecting patch mesh may be configured to generate and propagate feedback data in response to multiply-accumulate operations or local operand evaluation. The feedback data may include partial accumulation results, overflow flags, saturation indicators, condition codes, or other metadata reflecting the status or value of a local operation.

Feedback propagation may be initiated by one or more processing elements situated within the common region of the interconnecting patch mesh and may proceed directionally along a feedback pathway that may be distinct from the operand propagation pathway. The feedback pathway may be defined by a routing logic network configured to deliver upstream data signals toward the origin processing element of the interconnecting processing patch. In some configurations, the feedback mechanism may reuse a subset of the operand interconnect fabric operating in a reverse direction. In other configurations, a dedicated feedback channel may be defined in hardware, utilizing a lightweight unidirectional link to transport acknowledgment, condition, or scalar values from multiple processing elements toward a single aggregation node.

The origin processing element may include a feedback receiver module configured to aggregate or decode incoming feedback data. The origin processing element may optionally use the received feedback to trigger secondary broadcast actions, update operand generation logic, initiate patch reconfiguration, or provide synchronization points for downstream patch execution.

In some embodiments, feedback data may be broadcast from a central processing element within the interconnecting patch mesh, such as a bridging element positioned at or near the geometric center of the logical patch region. The selection of one or more feedback sources may be defined by patch configuration parameters or determined dynamically based on operand dependency or execution phase.

In various implementations, feedback data may be routed synchronously in lockstep with propagation timing or buffered within intermediate elements of the interconnecting patch mesh using staging FIFOs, depending on path length and timing constraints. This flexibility supports deterministic return of results or adaptive reduction.

The feedback mechanism enables dynamic operand control, late-stage operand injection, and conditional patch behavior in accordance with the execution results or operand flow status within the patch mesh. The feedback capability supports scenarios where upstream processing elements require visibility into downstream execution for the purposes of pipeline scheduling, adaptive quantization, or convergence detection in machine learning models.

Patch-Chained Execution Across Interconnected Patch Regions

In some embodiments, operand propagation and accumulation across the processing array may be organized as a sequence of dependent patch operations, where a first patch region provides operand data or intermediate accumulation results to a second patch region through a shared overlapping region or through an operand routing mechanism. This behavior, referred to as patch-chained execution, enables hierarchical compute scheduling and data reuse across adjacent or non-adjacent patches.

A patch-chained execution flow may be established between an interconnecting processing patch and a logical processing patch, where the interconnecting processing patch serves as an upstream operand source and the logical processing patch acts as a downstream compute region. Operand data propagated from the origin processing element of the interconnecting processing patch may be accumulated within the interconnecting patch mesh and then handed off to the logical processing patch for subsequent multiply-accumulate operations, operand redistribution, or result staging.

Patch chaining may also be supported across multiple patch layers, where a third patch region may be configured to receive operand or result data from the logical processing patch. In such configurations, each patch may operate under a distinct patch mode configuration, operand timing schedule, or quantization profile, with operand handoff points defined through patch overlap, bridging elements, or explicitly programmed interconnects.

To enable patch-chained execution, the system may utilize patch-to-patch operand forwarding logic, operand reuse control signals, or storage elements such as FIFO buffers, register windows, or ping-pong storage blocks positioned within the overlapping region. Additionally, each patch may be assigned a unique patch identifier (PRID) and coordinate scope (PCID) to ensure correct operand targeting and inter-patch data coherence.

Patch-chained execution facilitates tiled or block-structured dataflows and supports high-utilization compute patterns for large matrix operations, convolution layers, and recursive reduction tasks. By enabling operand reuse and inter-patch operand transfer without requiring off-chip buffering or global operand broadcast, patch chaining improves throughput and reduces operand latency across the processing array.

Additionally, or alternatively, patch-chained execution may be configured between patches that are adjacent, overlapping, or entirely disjoint in the array, depending on the operand handoff mechanism. Operand data may be written to an intermediary storage or routed directly from output PEs of one patch to input PEs of a subsequent patch using patch chaining registers or patch-forward instructions.

Irregular and Sparse Patch Shaping Using Selective Processing Element Modes

In some embodiments, a patch region may be configured to include an irregular or sparsely populated set of processing elements, deviating from a fully populated rectangular geometry. This configuration enables operand propagation and accumulation to proceed in patch topologies that are non-uniform, L-shaped, T-shaped, or otherwise discontinuous, based on workload shape, operand tiling, or data sparsity.

To enable such irregular patch shaping, one or more processing elements within the patch region may be selectively configured into a non-compute mode in which the processing element does not perform a multiply-accumulate operation but continues to participate in operand propagation. In some implementations, the processing element may be set to a data-passing mode, herein referred to as Sleep::MOVE, where the element receives operand data from a source direction and forwards the data to one or more neighboring elements based on the patch's propagation topology.

In some embodiments, one or more processing elements of the interconnecting patch mesh may be configured in a data-passing mode in which operand propagation may be permitted without performing a computation such as a multiply-accumulate. The presence of data-passing elements may be dependent on the shape, size, and operand routing path of the configured patch. Certain configurations may include no processing elements in data-passing mode (e.g., when all operand-consuming elements are directly connected), while other configurations may include multiple such elements. Accordingly, between zero and N−1 processing elements within a patch may be dynamically configured in data-passing mode to support flexible and irregular patch geometries.

In some implementations, data-passing mode may be applied to a subset of processing elements such that operand data is relayed across gaps or around inactive elements. This configuration allows for the creation of irregular or sparse patch shapes, where only selected elements participate in computation and others serve to bridge operand flow. These patches may include shapes such as L-forms, diagonal paths, or disjoint subclusters linked via data-passing elements.

Alternatively, a processing element may be configured into a complete off mode, referred to as Sleep::OFF, in which the element does not engage in compute or operand forwarding. This mode may be used to form hard boundaries or blocked zones within a patch when patch constraints or data hazards require isolation of specific elements.

The selection of active, passing, or off modes for each processing element may be configured via patch-level registers or per-element control bits defined as part of the patch programming model. In some embodiments, irregular patch shaping may be enabled by associating each element with a compute participation flag and a propagation enable mask that defines whether the element should receive, process, and/or forward operand data.

Bridging Element and Operand Redistribution within Patch Mesh

In some embodiments, a processing element located within the interconnecting patch mesh may be configured to serve as a bridging element that receives operand data from the interconnecting processing patch and redistributes the operand data into the logical processing patch. A “bridging processing element” or “bridging element” preferably refers to a processing element located within the overlapping region of two patches, typically near the center of the logical patch, which serves as a relay point for operand propagation from the interconnecting patch. The bridging PE may be configured with enhanced forwarding or fan-out behavior. The bridging element may be positioned at or near the geometric center of the logical processing patch or may be otherwise selected based on connectivity, operand latency, or control configuration.

The bridging element operates as a handoff node, receiving operand data delivered through the systolic broadcast originating from the origin processing element of the interconnecting processing patch. Upon receipt, the bridging element may forward the operand data directionally into surrounding processing elements of the logical processing patch, thereby initiating a secondary operand propagation sequence internal to the logical patch.

In some embodiments, a bridging processing element may be positioned near or at the geometric center of the logical processing patch. The bridging element may be responsible for receiving operand data from the overlapping interconnecting patch mesh and redistributing it to neighboring processing elements in the logical patch. The central location of the bridging element facilitates balanced fan-out and spatial reuse across the logical patch.

The redistribution behavior may be governed by a propagation schedule defined by the patch mode configuration of the logical processing patch. For instance, operand data arriving at the bridging element may be broadcast radially outward in a wavefront pattern-aligned to the operand usage and topology defined for the logical patch.

In some implementations, the bridging element may store the received operand data in a local register or FIFO staging buffer to align redistribution timing with the logical patch's MAC execution schedule. Additionally, the bridging element may apply transformation logic such as format decoding, quantization adjustment, or operand re-indexing prior to re-propagation.

The assignment of bridging behavior to a particular processing element may be encoded in the patch configuration fields, such as a bridging enable bit or region-scoped broadcast role identifier. Multiple bridging elements may also be defined within a single overlapping region to enable multi-source redistribution, conditional operand steering, or localized operand fan-out.

The bridging mechanism enables operand reuse and modular propagation behavior between patches, decoupling the operand flow origin from the operand compute destination. This approach supports localized coordination between adjacent patch regions and allows the logical processing patch to operate on operand data originating externally with minimal reconfiguration or broadcast duplication.

Figure 5:
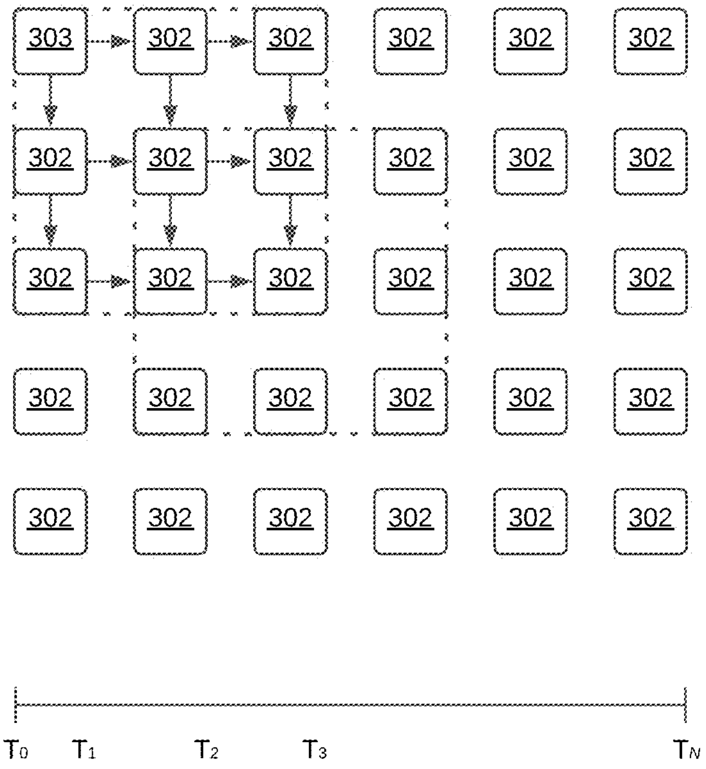
FIG. 5 illustrates a schematic representation of a propagation of operand data in a wavefront manner in accordance with one or more embodiments of the present application.

FIG. 5 illustrates a timing diagram that depicts the wavefront propagation of a broadcast operand across a patch region and the corresponding scheduling of multiply-accumulate (MAC) operations in a pipelined execution model. The timing diagram corresponds to a patch mesh configuration as shown in FIG. 5, with a designated origin core 303 and a surrounding group of array processing cores 302 forming the patch.

Time may be represented along the horizontal axis in discrete clock cycles, beginning with cycle To. The vertical axis enumerates processing cores by their relative location within the patch, including the origin core 303 and other cores at increasing Manhattan distances from the origin core. For ease of illustration, the example shown includes a 3×3 patch configuration.

At cycle To, the origin core 303 initiates a broadcast after receiving a broadcast operand value via the feed path. The broadcast operand value may be propagated outward from the origin core using the patch mesh interconnect 312 in a directional wavefront pattern. Processing cores located one interconnect hop from the origin, such as PE[0][1] and PE[1][0], receive the broadcast operand at T1. Cores located two hops away, such as PE [1][1], receive the operand at T2, and so forth.

Each processing core may be configured to initiate a MAC operation in the cycle immediately following its receipt of the broadcast operand. Upon receiving the broadcast operand, a core retrieves a corresponding source operand from its source region 318 in local register memory 310, and the MAC unit 316 computes a multiply-accumulate result using the broadcast operand and the source operand. The computed result may then be staged in a result buffer or a FIFO for deferred writeback to the destination region 320.

The staggered wavefront propagation ensures that only a small subset of MAC units are active during any given clock cycle, thereby avoiding contention on shared interconnect resources and allowing for efficient pipelining of accumulation results. For example, while cores at distance-1 execute their MAC operations in cycle T2, cores at distance-2 receive the operand and prepare for MAC execution in cycle T3.

In certain embodiments, accumulation results may be queued using a FIFO pipeline, enabling overlapping of computation and memory writeback stages. The FIFO pipeline structure preferably allows the MAC unit to remain active and responsive to incoming broadcasts even when a prior result may be in the process of being written back.

The timing diagram of FIG. 5 demonstrates the deterministic latency model inherent in the patch mesh broadcast architecture. Because the MAC execution of each processing core may be triggered at a predictable offset relative to the origin broadcast, the system scheduler or compiler may orchestrate broadcast sequences with fine-grained control over operand alignment and compute reuse. This broadcast timing technique may be particularly beneficial for tiled matrix multiplication, convolutional kernel application, and transformer QKV sequence processing, where consistent operand arrival and execution windows maximize hardware utilization.

In some embodiments, the patch mode configuration parameter determines whether broadcasts are depth-fired or face-fired, allowing for different data and computational relationships to be handled.

Accordingly, the timing behavior shown in FIG. 5 exemplifies the low-overhead, locality-optimized operation enabled by the patch mesh architecture. Deterministic wavefront delivery, pipelined compute stages, and programmable patch configurations collectively contribute to enhanced throughput, energy efficiency, and architectural scalability.

In some embodiments, a patch mesh interconnect may support a push-based operand propagation protocol configured to deliver broadcast operands directionally across a patch region comprising a subset of processing elements. Each processing element in the patch region may implement a set of directional operand interfaces including North, South, East, and West (N, S, E, W) input and output ports. Broadcast operand propagation may be initiated at an origin core and distributed through a sequence of routing decisions and delays governed by the patch configuration and boundary constraints.

Each processing element may include routing logic configured to forward incoming operands to downstream elements. Forwarding behavior may depend on the position of the processing element relative to the patch origin and patch boundaries. For example, a processing element located along the Western boundary of the patch may be configured to only propagate received operands to its East and South neighbors. This behavior avoids data reflection or redundant operand circulation beyond the patch perimeter. The propagation may be governed by a pwalls parameter that defines the active walls (N, S, E, W) of the patch region.

Operand forwarding may follow a wavefront broadcast pattern, wherein the origin core broadcasts the operand simultaneously to its East and South neighbors, and each subsequent neighbor continues the propagation in those same directions. The propagation delay across each hop may be one clock cycle, and the operand arrival time at each processing element may be a function of its Manhattan distance from the origin core. This enables staggered execution of multiply-accumulate operations in a systolic manner.

To maintain operand alignment with the internal execution pipeline, each processing element may implement a patch-local FIFO (PLFIFO) to stage incoming broadcast operands. The PLFIFO ensures that broadcast operands arrive in synchrony with source operand availability and MAC unit readiness. In cases where a processing element may also be serving as a source operand feeder, incoming broadcast operands may be routed into a separate patch-shared FIFO (PSFIFO) to defer execution until the feeder activity completes. The PSFIFO allows the processing element to continue propagating broadcast operands to downstream neighbors even while deferring local MAC execution.

This architectural arrangement permits overlapping of operand broadcast, MAC computation, and result storage, while preserving dataflow correctness across the patch region. Operand collisions or race conditions may be avoided through use of cycle-aligned propagation rules and patch cycle configuration parameters.

In some implementations, a priority arbitration scheme may be employed at each processing element to schedule access to shared memory ports in the following order: (1) operand feed port, (2) MAC source operand port, and (3) accumulation writeback port. This hierarchy allows broadcast and compute operations to proceed with minimal disruption even in the presence of temporary memory access contention.

The dataflow model described above supports highly localized, deterministic, and scalable multiply-accumulate execution in spatially partitioned regions of the array, while reducing global interconnect pressure and supporting workload-adaptive patch configurations.

Directional Wall Configuration for Operand Propagation

In some embodiments, the interconnecting processing patch may be configured with one or more propagation walls that define the permissible directions for operand propagation across the patch. The wall configuration may be encoded as a directional control mask associated with the patch region, where each bit or field specifies whether propagation may be enabled in a given direction from each processing element of the interconnecting patch.

The directional control mask may define operand broadcast permissions across cardinal directions including north, south, east, and west relative to the geometric layout of the processing array. Each processing element may evaluate the wall configuration prior to issuing a broadcast signal to a neighboring element. For example, if the eastward propagation bit may be deasserted for a given processing element, operand data present at that element will not be forwarded to the eastward neighbor regardless of operand readiness or MAC eligibility at that destination.

The wall configuration may be uniformly applied across all processing elements of the patch or selectively assigned on a per-element basis to form non-uniform or irregular propagation patterns. The wall control logic may be implemented in a dedicated patch wall control register (PWALL), a per-PE configuration table, or derived dynamically based on patch bounding box parameters.

In some implementations, directional walls may be used to enforce rectangular or L-shaped operand flow regions by disabling operand leakage outside of the desired compute region. Directional constraints may also be applied to restrict dataflow along one axis while permitting full broadcast along another axis.

The directional wall configuration enables fine-grained control over the operand dataflow footprint within a patch and prevents unintended operand propagation beyond patch boundaries or into neighboring logical domains. This selective propagation behavior enhances operand locality, reduces interconnect contention, and supports multi-region execution isolation.

2. Method for Implementing a Patch Mesh in an Integrated Circuit Array

Figure 2:
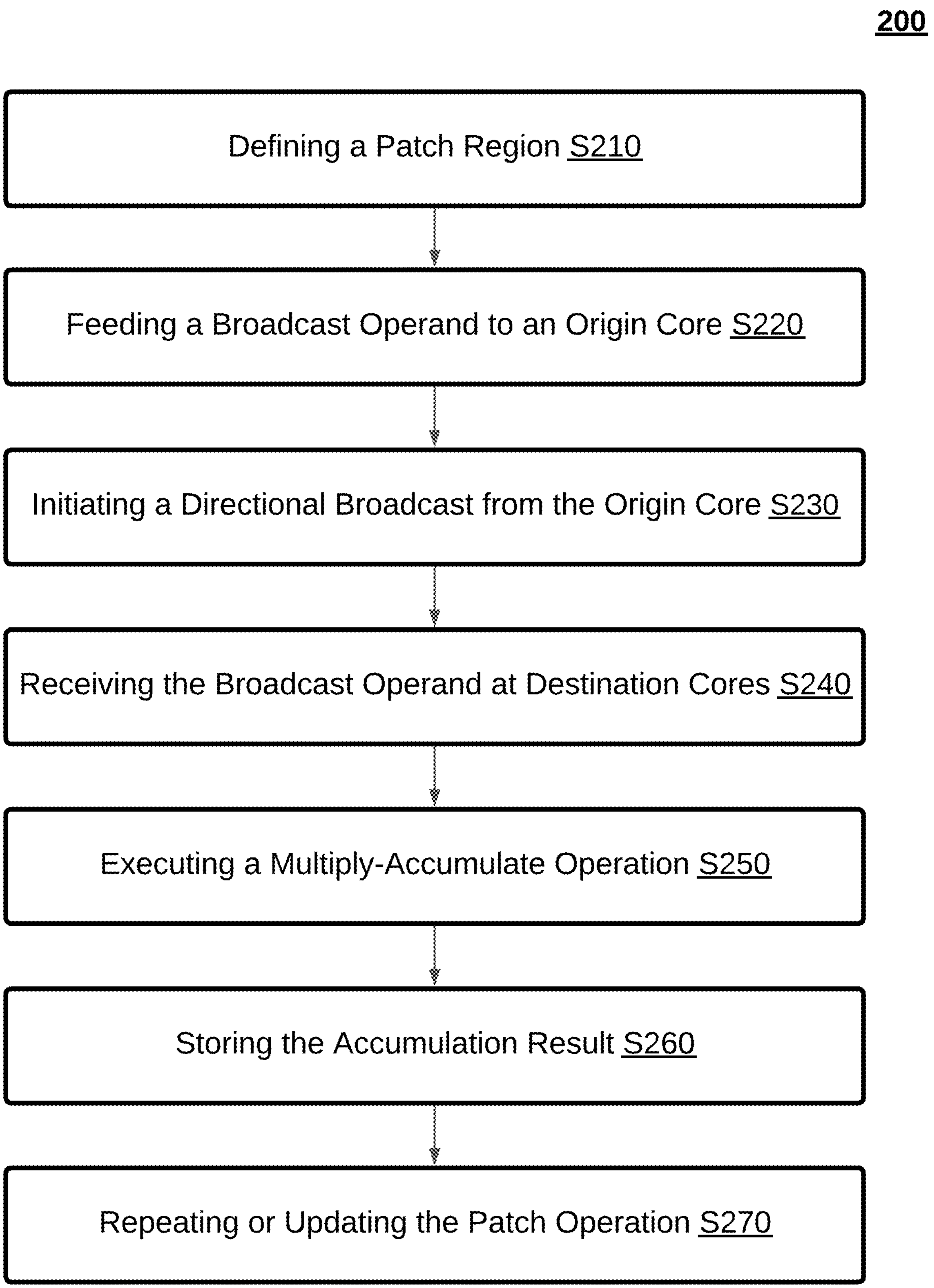
FIG. 2 illustrates an example method 200 in accordance with one or more embodiments of the present application.

As shown by way of example in FIG. 2, a method 200 for executing a directional broadcast and multiply-accumulate operation using a patch mesh interconnect includes defining a patch region S210, feeding a broadcast operand to an origin core S220, initiating a directional broadcast from the origin core S230, receiving the broadcast operand at destination cores S240, executing a multiply-accumulate operation S250, storing the accumulation result S260, and repeating or updating the patch operation S270.

2.10 Defining the Patch Region

S210, which includes defining a patch region, may function to identify a subset of processing elements within a processing array that may participate in a broadcast and multiply-accumulate operation using a patch mesh interconnect architecture. In step S210, a patch region may be defined within an array of processing elements identified as processing elements 102. The patch region may be a two-dimensional rectilinear grid or in another suitable layout that includes a collection of array processing cores within the boundaries or shape of the patch region that enables operand propagation via a patch mesh interconnect 312. The patch region may comprise a subset of the array of processing cores, selected to participate in a localized broadcast and multiply-accumulate operation. In various embodiments, the patch region may include a rectangular group of processing elements or may alternatively include an irregular set of processing elements, depending on system configuration and operand scheduling requirements.

Additionally, or alternatively, S210 may include implementing a patch configuration controller 301 that may be configured to receive (configuration) data that defines one or more patch-defining parameters. In one embodiment, the patch-defining parameters may include a patch size parameter PSIZE 304, which specifies the number of processing elements in the patch. Additionally, a patch mode parameter may be provided to indicate whether the patch operates in a face-firing configuration, a depth-firing configuration, or another propagation scheme based on workload type.

Additionally, in one or more embodiments, the definition of the patch region may include identification of a processing element designated as an origin core 303. The origin core 303 may be configured to initiate operand broadcasting across the patch mesh interconnect 312. In one or more embodiments, the origin core 303 may operate as an entry point of operand data from off-array memory and an exit point to off-array memory. In some implementations, the origin core 303 may be identified using coordinate values corresponding to its column and row position within the array of processing elements. In alternate embodiments, the selection of the origin core 303 may be determined by dispatch logic, compiler heuristics, data locality, or runtime operand residency within a broadcast region 309 of a local register memory 310.

Following the receipt of patch-defining parameters, the patch configuration controller 301 may configure routing paths within the patch mesh interconnect 312 to support unidirectional operand data propagation. The resulting interconnect configuration may define a virtual patch mesh among the selected processing elements. In some embodiments, multiple patches may be defined concurrently, either as adjacent tile groups within the array or as time-multiplexed regions executed in succession.

Accordingly, an ability to define a localized patch region enables operand broadcasting, MAC synchronization, and accumulation operations to be spatially restricted, reducing broadcast contention and improving throughput. Patch parameters such as PSIZE 304 and PDEPTH 305 may be adapted based on application-specific needs. For example, a smaller patch may be defined for narrow convolution filters, while a wider patch may be defined for generalized matrix multiplication. Patch redefinition may occur dynamically based on workload scheduling intervals, layer transitions, or instruction sequencing within a program execution pipeline.

2.20 Sourcing a Broadcast Operand to the Origin Core

S220, which includes feeding a broadcast operand to an origin core, may function to route a first operand value from one or more source locations to a designated origin core within the patch region for staging prior to directional propagation. In step S220, an input operand may be retrieved from a broadcast region 309 within a local register memory 310 of a processing element 302. The operand may correspond to a value scheduled for use in a multiply-accumulate operation to be performed across a defined patch region. The patch region may be configured as described in step S210 and may include a designated origin core 303 selected to initiate operand propagation.

A feed path interconnect may be utilized to route the operand value from its originating location to the origin core 303. In one embodiment, the feed path interconnect may include a dedicated or multiplexed routing channel capable of unicast data delivery from a selected source to the origin core 303. Operand selection and routing may be coordinated by a patch configuration controller 301 or by instruction scheduling logic capable of issuing data movement commands.

Upon receipt of the operand, the origin core 303 may stage the operand value in a broadcast staging register or equivalent operand buffer associated with the origin core 303. Staging of the operand may serve to decouple operand delivery from operand propagation, thereby enabling precise control over broadcast timing. In some embodiments, staging may also support operand re-use across multiple broadcast iterations.

2.30 Initiating a Directional Broadcast from the Origin Core

S230, which includes initiating a directional broadcast from the origin core, may function to trigger a unidirectional wavefront broadcast of the operand value through a patch mesh interconnect that couples the origin core to each processing element in the patch. In step S230, a broadcast operation may be initiated from an origin core 303 to the remaining processing elements 302 included in a defined patch region. The patch region may be defined by configuration parameters received and processed during execution of step S210. The origin core 303 may initiate the broadcast after receiving an input operand staged in a broadcast staging register as described in step S220.

The broadcast operation may utilize a patch mesh interconnect 312 configured to propagate operand values directionally across the processing elements 302 within the patch region. The patch mesh interconnect 312 may support unidirectional wavefront propagation, in which the broadcast operand may be delivered in successive clock cycles to processing elements 302 at increasing interconnect distances from the origin core 303. The broadcast may be synchronized to advance deterministically across rows and columns of the patch region, producing a cascading effect referred to as a wavefront pattern.

Each processing element 302 within the patch mesh may receive the broadcast operand in a cycle determined by its Manhattan distance from the origin core 303. In one embodiment, the interconnect latency between adjacent cores may be one clock cycle, such that a core positioned two hops from the origin core 303 receives the operand two cycles after the broadcast may be initiated. This deterministic timing model may allow precise scheduling of downstream MAC operations.

The directional broadcast initiated in step S230 establishes synchronized delivery of operand data across a localized set of processing elements 302, allowing the system to exploit locality, reduce contention, and schedule compute operations with minimal idle cycles.

2.40 Receiving the Broadcast Operand at Destination Cores

S240, which includes receiving the broadcast operand at destination cores, may function to enable each processing element in the patch to latch the broadcast operand value with a cycle-aligned delay based on topological distance from the origin core. In step S240, each processing element 302 located within a patch region receives a broadcast operand that was propagated directionally from an origin core 303 via a patch mesh interconnect 312. The broadcast operand may be delivered to each processing element 302 at a delay that corresponds to the number of interconnect hops separating the processing element 302 from the origin core 303. The propagation of the operand may follow a wavefront pattern such that each diagonal, row, or column of the patch region receives the operand in sequential clock cycles, forming a cascading delivery sequence that may be both deterministic and latency-aware.

In one or more embodiments, each processing element 302 may include a broadcast operand latch configured to receive and temporarily store the broadcast operand. The broadcast operand latch may support operand capture upon operand arrival and may hold the operand in synchronization with the system clock or a local execution clock domain. Operand latching may be coordinated using broadcast tagging, arrival detection, or wavefront timing signals generated in response to the broadcast initiation sequence described in step S230.

Additionally, receipt of the broadcast operand at each processing element 302 enables subsequent execution of a multiply-accumulate operation using locally stored operand values. Because the timing of operand arrival may be deterministic, the receipt event may serve as an implicit trigger for compute operations, thereby simplifying execution control and reducing the need for explicit synchronization mechanisms.

Accordingly, the reception behavior described in step S240 enables spatially distributed processing elements 302 to operate in a tightly coordinated compute pattern without requiring full-array broadcasting, global arbitration, or external data movement. The localized operand capture at each core, combined with the structured wavefront arrival, prepares the system for high-throughput, low-latency multiply-accumulate execution as described in step S250.

2.5 Executing Multiply-Accumulate Operations

S250, which includes executing a multiply-accumulate operation, may function to compute a product of the broadcast operand and a locally stored operand at each processing element and to accumulate the result using a multiply-accumulate unit. In step S250, each processing element 302 included within a defined patch region performs a multiply-accumulate operation in response to receipt of a broadcast operand. The broadcast operand may be received and latched as described in step S240. A second operand may be locally retrieved from a source region 318 of a local register memory 310 associated with the respective processing element 302. Retrieval of the second operand may be performed concurrently with or immediately after the arrival of the broadcast operand, depending on the operand readiness model employed by the patch configuration.

In one or more embodiments, a multiply-accumulate unit 316 within each processing element 302 may be configured to execute a mathematical operation of the form A×B+C. In one embodiment, the broadcast operand may function as operand A, the locally retrieved source operand serves as operand B, and operand C corresponds to an accumulation value either initialized or retrieved from a destination region 320 or from a result buffer associated with the processing element 302. Operand C may also be derived from a previously stored accumulation value maintained in a FIFO accumulator or a pipelined register bank.

In some embodiments, the multiply-accumulate unit 316 may operate in a single-cycle or pipelined mode, depending on system implementation. In pipelined configurations, operand A and operand B may enter an initial computation stage, and the partial result may be forwarded to an accumulation or summation stage before being staged for write-back. A result staging buffer may be used to temporarily hold the computed result. The result staging buffer may facilitate decoupling of arithmetic computation from subsequent memory writeback operations and may support backpressure mechanisms to avoid pipeline stalls.

Additionally, or alternatively, the execution of the multiply-accumulate operation in step S250 may be tightly synchronized with the arrival of the broadcast operand, as governed by the wavefront timing structure established in step S230. Each processing element 302 may implement or fire the multiply-accumulate unit 316 in the clock cycle immediately following operand arrival or in accordance with a programmable delay model configured by a patch configuration controller 301.

Implementing a Ping-Pong Buffer in Patch-Based Multiply-Accumulate Execution

In one or more embodiments, a ping-pong buffer mechanism may be implemented within each processing element 302 of the patch region to facilitate non-blocking, alternating access to intermediate accumulation results. The ping-pong buffer mechanism enables double-buffered (e.g., double-banked) storage of multiply-accumulate outputs, providing temporal decoupling between the execution pipeline and the writeback logic. This implementation may be particularly advantageous in systems where operand arrival and MAC execution are deterministically timed, such as with the wavefront broadcast pattern described in step S230, and where it may be beneficial to overlap compute and storage operations across cycles.

Each ping-pong buffer preferably comprises two alternating result registers, designated as a ping register and a pong register. After a multiply-accumulate unit 316 completes an arithmetic computation, the resulting value may be written into one of the registers based on a toggled select signal. While the current MAC result may be being written into, for example, the ping register, the previously stored value in the pong register may be simultaneously read and committed to the destination region 320 or forwarded to downstream pipeline stages.

The toggling control logic may be implemented via a toggle latch or a local control FSM (finite-state machine) within each processing element 302, which alternates the active register for result write-in on a per-cycle or per-operation basis. In some embodiments, the toggle logic may be synchronized with the wavefront arrival schedule or the FIFO availability state to ensure that no buffer overwrite occurs before the prior value may be committed.

Additionally, the use of a ping-pong buffer enables back-pressure-resilient execution: when the writeback controller or FIFO accumulator pipeline experiences temporary stalls, the MAC unit 316 may continue producing results without stalling, as long as at least one of the ping or pong buffers remains available. This improves arithmetic utilization and avoids pipeline idling in scenarios where the destination region 320 or memory interface may exhibit variable latency.

In some embodiments, the ping-pong buffer may interface with a local accumulation engine, such that results written to the buffer may be recursively accumulated across compute passes before final commitment.

Accordingly, the ping-pong buffer implementation enhances the temporal decoupling between compute and memory systems within the patch region and supports high-throughput operation under varying workload and interconnect timing conditions.

3.6 Storing the Accumulation Result

S260, which includes storing the accumulation result, may function to commit the output of the multiply-accumulate operation to a destination register region via a result staging buffer or FIFO pipeline configured within the processing element. In step S260, each processing element 302 stores the result produced by the multiply-accumulate operation executed in step S250. The result may be transferred from a result staging buffer to a destination region 320 of a local register memory 310. The destination region 320 may be implemented as a dedicated memory bank, a dual-port register file, or another form of locally addressable storage capable of receiving arithmetic results.

In some embodiments, the multiply-accumulate result may first be forwarded through a FIFO accumulator pipeline. The FIFO accumulator pipeline may enable decoupling of execution and memory writeback operations, allowing the multiply-accumulate unit 316 to remain active while previously computed results are queued for commitment to memory. The FIFO accumulator pipeline may support one or more stages, including intermediate buffering, alignment logic, or accumulation extension stages.

Additionally, or alternatively, a writeback controller may coordinate the storage of result values from the FIFO accumulator pipeline or result staging buffer to the destination region 320. The writeback controller may implement logic to resolve data hazards, manage memory bank conflicts, and enforce ordering constraints where applicable. In some configurations, the writeback controller may operate independently for each processing element 302, while in other configurations, a centralized or partially shared controller may be employed.

In one or more embodiments, the timing of the storage operation may be statically defined based on pipeline depth or dynamically scheduled based on FIFO status, operand readiness, or downstream workload requirements. The destination region 320 may also serve as the accumulation source for subsequent passes.

The storage of accumulation results in step S260 completes a localized compute cycle within the patch region and prepares the processing elements 302 for subsequent operations. The patch configuration may allow multiple compute-storage iterations to occur without redefining the patch, depending on system workload and compiler-issued instructions. The behavior defined in step S260 supports pipelined execution, sustained arithmetic throughput, and localized data reuse across multiple compute passes.

2.7 Repeating or Updating the Patch Operation

S270, which includes repeating or updating the patch operation, may function to determine whether to re-execute the patch computation using the existing configuration or to redefine the patch region for execution of a subsequent compute phase. In step S270, the integrated circuit evaluates whether to repeat the existing patch operation or to reconfigure the patch for a subsequent compute sequence. A patch configuration controller 301 may initiate this evaluation based on instruction stream directives, workload scheduling inputs, or completion signals received from one or more processing elements 302.

If the patch may be reused without modification, a new broadcast operand may be fetched and fed to an origin core 303 as described in step S220. Subsequent steps involving directional broadcast, operand reception, multiply-accumulate execution, and result storage may then be repeated for the newly supplied operand. In configurations supporting pipelined or iterative matrix operations, the patch region may persist across multiple compute passes, thereby amortizing patch definition overhead.

Alternatively, a new patch configuration may be generated by updating one or more of the patch-defining parameters including patch size PSIZE 304, patch depth PDEPTH 305, or patch mode. A new origin core 303 may also be specified. Upon updating the configuration, a new patch mesh interconnect topology may be instantiated to accommodate a different operand access pattern, computation stencil, or spatial data structure.

The decision to repeat or reconfigure the patch may be based on factors such as layer boundaries in a neural network model, tile boundaries in a matrix multiplication kernel, or conditional execution flags indicating workload transitions. The patch configuration controller 301 may coordinate with compiler-generated instruction metadata, hardware loop counters, or external control signals to manage the reconfiguration process.

Execution of step S270 enables dynamic patch adaptation while preserving architectural efficiency. By allowing localized compute operations to be reapplied or restructured with minimal control overhead, the patch mesh system supports high-throughput, low-latency acceleration across a wide range of dataflow workloads. The behavior defined in step S270 closes the compute loop and enables scalable repetition of the broadcast and multiply-accumulate cycle described in steps S210 through S260.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component may preferably be a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method for directional operand distribution and execution within a processing array of an integrated circuit comprising a plurality of processing elements arranged in a two-dimensional topology, the method comprising:

defining, by a configuration controller, a patch region comprising a selected subset of the plurality of processing elements wherein defining the patch region comprises configuring a patch mode parameter that specifies an operand reuse and compute sequencing behavior for the patch region, the patch mode parameter indicating a depth firing mode or a face-firing mode;

designating, within the patch region, an origin processing element;

broadcasting, from the origin processing element, operand data across the patch region in a directionally constrained propagation pattern such that:

propagation of the operand data between adjacent processing elements occurs with a deterministic inter-element latency, and an arrival time of the operand data at each processing element within the patch region is a function of a topological distance between the processing element and the origin processing element;

triggering, at each processing element of the patch region, execution of a multiply-accumulate operation in response to receipt of the operand data; and storing, at each processing element within the patch region, a result of the multiply-accumulate operation in a local accumulation storage structure, wherein the patch region is spatially confined relative to the processing array such that operand propagation is restricted to the selected subset of processing elements and does not require global broadcast across the processing array.

2. The method of claim 1, wherein the deterministic inter-element latency corresponds to a Manhattan distance between the origin processing element and each respective processing element within the patch region, such that operand data propagates outward from the origin processing element in a wavefront pattern across rows and columns of the patch region.

3. The method of claim 1, wherein propagation of the operand data between adjacent processing elements is restricted in one or more cardinal directions according to a directional wall configuration parameter that defines active propagation boundaries within the patch region.

4. The method of claim 1, further comprising staging the operand data within a patch-local first-in-first-out (FIFO) buffer at one or more processing elements to temporally align arrival of the operand data with availability of a source operand for the multiply-accumulate operation.

5. The method of claim 1, wherein storing the result of the multiply-accumulate operation comprises writing the result into a ping-pong buffer comprising a first result register and a second result register that are alternately selected for storing successive multiply-accumulate results.

6. The method of claim 1, further comprising:

inserting, during propagation of the operand data or execution of the multiply-accumulate operation, a programmable pause interval having a duration defined by a pause count value stored in a control register.

7. The method of claim 1, further comprising:

generating, at one or more processing elements within the patch region, feedback data responsive to execution of the multiply-accumulate operation, and propagating the feedback data from the one or more processing elements to the origin processing element along a feedback pathway that is distinct from a propagation pathway used for broadcasting the operand data.

8. The method of claim 1, further comprising:

applying a zero-point correction to the operand data or to the result of the multiply-accumulate operation using a zero-point adjustment value stored in a programmable register, wherein the zero-point adjustment value corresponds to an asymmetric quantization parameter associated with the operand data.

9. The method of claim 1, wherein the patch region comprises an irregular or sparse shape formed by configuring at least one processing element within the patch region in a data-passing mode that forwards the operand data to a downstream processing element while disabling execution of the multiply-accumulate operation at the at least one processing element.

10. The method of claim 1, wherein:

defining the patch region comprises broadcasting a patch region identifier to the plurality of processing elements, and each processing element within the patch region self-determines a patch-relative configuration based on the patch region identifier and global coordinate data of the processing element within the processing array.

11. The method of claim 1, further comprising:

determining a patch cycle count value that defines a number of execution cycles allocated for operand propagation and multiply-accumulate execution within the patch region, wherein the patch cycle count value is computed as a function of at least patch size and patch depth.

12. The method of claim 1, further comprising:

defining a second patch region comprising a second subset of the plurality of processing elements, and forwarding operand data or intermediate accumulation results from the patch region to the second patch region to execute a patch-chained sequence of multiply-accumulate operations without storing the operand data or the intermediate accumulation results to off-array memory.

13. The method of claim 12, wherein forwarding operand data or intermediate accumulation results comprises routing the operand data or intermediate accumulation results through a bridging processing element positioned within an overlapping region between the patch region and the second patch region, the bridging processing element redistributing the operand data to one or more neighboring processing elements of the second patch region.

14. The method of claim 1, further comprising:

at a processing element within the patch region that is concurrently performing a source operand feed operation, routing the operand data into a patch-shared first-in-first-out (FIFO) buffer to defer local multiply-accumulate execution while permitting continued propagation of the operand data to downstream processing elements.

15. A system comprising:

an integrated circuit including a processing array comprising a plurality of processing elements arranged in a two-dimensional topology;

a configuration controller operable to define a patch region comprising a selected subset of the plurality of processing elements and to designate an origin processing element within the patch region wherein defining the patch region comprises configuring a patch mode parameter that specifies an operand reuse and compute sequencing behavior for the patch region, the patch mode parameter indicating a depth-firing mode or a face firing mode;

an interconnect fabric coupling the plurality of processing elements, the interconnect fabric configured to propagate operand data from the origin processing element to other processing elements within the patch region in a directionally constrained propagation pattern such that propagation between adjacent processing elements occurs with a deterministic inter-element latency;

a multiply-accumulate unit within each processing element of the patch region, the multiply-accumulate unit configured to execute a multiply-accumulate operation in response to receipt of the operand data; and a local accumulation storage structure within each processing element configured to store a result of the multiply-accumulate operation, wherein an arrival time of the operand data at each processing element within the patch region is a function of a topological distance between the processing element and the origin processing element, and wherein propagation of the operand data is confined to the patch region without requiring global broadcast across the processing array.

16. The system of claim 15, wherein the deterministic inter-element latency corresponds to a Manhattan distance between the origin processing element and each respective processing element within the patch region, such that the operand data propagates outward from the origin processing element in a wavefront pattern across rows and columns of the patch region.

17. The system of claim 15, wherein the configuration controller is further operable to define a directional wall configuration parameter that restricts propagation of the operand data between adjacent processing elements in one or more cardinal directions within the patch region.

18. The system of claim 15, wherein each processing element within the patch region further comprises a patch-local first-in-first-out (FIFO) buffer configured to stage received operand data and temporally align execution of the multiply-accumulate operation with availability of a source operand.

19. A method for spatially distributing operand data within a processing array of an integrated circuit comprising a plurality of processing elements arranged in a two-dimensional topology, the method comprising:

defining, by a configuration controller, a patch region comprising a selected subset of the plurality of processing elements wherein defining the patch region comprises configuring a patch mode parameter that specifies an operand reuse and compute sequencing behavior for the patch region, the patch mode parameter indicating a depth firing mode or a face firing mode;

designating, within the patch region, an origin processing element;

broadcasting operand data from the origin processing element across the patch region in a directionally constrained propagation pattern such that:

propagation of the operand data between adjacent processing elements occurs with a deterministic inter-element latency; and an arrival time of the operand data at each processing element within the patch region is a function of a topological distance between the processing element and the origin processing element;

storing, at each of one or more processing elements within the patch region, the operand data in local memory of the respective processing element without performing a multiply-accumulate operation on the operand data, wherein propagation of the operand data is confined to the patch region and does not require global broadcast across the processing array.

* * * * *